US006801662B1

(12) United States Patent
Owechko et al.

(10) Patent No.: US 6,801,662 B1
(45) Date of Patent: Oct. 5, 2004

(54) SENSOR FUSION ARCHITECTURE FOR VISION-BASED OCCUPANT DETECTION

(75) Inventors: Yuri Owechko, Newbury Park, CA (US); Narayan Srinivasa, Moorpark, CA (US); Swarup S. Medasani, Thousand Oaks, CA (US); Riccardo Boscolo, Culver City, CA (US)

(73) Assignee: HRL Laboratories, LLC, Malibu, CA (US)

( * ) Notice: Subject to any disclaimer, the term of this patent is extended or adjusted under 35 U.S.C. 154(b) by 283 days.

(21) Appl. No.: 09/685,235

(22) Filed: Oct. 10, 2000

(51) Int. Cl.[7] .............................................. G06K 9/62
(52) U.S. Cl. ...................... 382/224; 382/103; 382/104; 382/284; 701/45
(58) Field of Search ....................... 382/100, 103–104, 382/106–107, 153–155, 159, 181, 190, 199, 205, 209, 212–213, 224, 226, 241, 254, 258, 266, 282, 283, 284, 312; 180/271, 272; 280/734, 735; 340/436; 701/45, 59, 77, 300

(56) References Cited

U.S. PATENT DOCUMENTS

| 5,173,949 | A | * | 12/1992 | Peregrim et al. | ............ 382/294 |
| 5,482,314 | A | | 1/1996 | Corrado et al. | ............. 280/735 |
| 5,531,472 | A | * | 7/1996 | Semchena et al. | .......... 280/735 |
| 5,767,922 | A | * | 6/1998 | Zabih et al. | ................. 348/700 |
| 5,845,000 | A | | 12/1998 | Breed et al. | ................ 382/100 |

(List continued on next page.)

FOREIGN PATENT DOCUMENTS

| DE | 197 57 595 A1 | 7/1999 |
| DE | 198 47 261 A1 | 4/2000 |
| DE | 199 47 062 A1 | 4/2000 |
| DE | 198 52 653 A1 | 5/2000 |
| WO | 99/25581 | 5/1999 |

OTHER PUBLICATIONS

Simpson "Fuzzy min–max neural networks–Part 1: Clasification", IEEE, pp. 776–786, 1992.*
Pratt "Digital Image Processing" a Wiley–Interscience Publication, pp. 471–495, 1978.*

(List continued on next page.)

*Primary Examiner*—Daniel Mariam
(74) *Attorney, Agent, or Firm*—Ladas & Parry

(57) ABSTRACT

A vision-based system for automatically detecting the type of object within a specified area, such as the type of occupant within a vehicle. Determination of the type of occupant can then be used to determine whether an airbag deployment system should be enabled or not. The system extracts different features from images captured by image sensors. These features are then processed by classification algorithms to produce occupant class confidences for various occupant types. The occupant class confidences are then fused and processed to determine the type of occupant. In a preferred embodiment, image features derived from image edges, motion, and range are used. Classification algorithms may be implemented by using trained C5 decision trees, trained Nonlinear Discriminant Analysis networks, Hausdorff template matching and trained Fuzzy Aggregate Networks. In an exemplary embodiment, class confidences are provided for a rear-facing infant seat, a front-facing infant seat, an adult out of position, and an adult in a normal or twisted position. Fusion of these class confidences derived from multiple image features increases the accuracy of the system and provides for correct determination of an airbag deployment decision.

64 Claims, 11 Drawing Sheets

U.S. PATENT DOCUMENTS

| | | | | |
|---|---|---|---|---|
| 5,890,085 A | | 3/1999 | Corrado et al. | 701/47 |
| 5,963,653 A | * | 10/1999 | McNary et al. | 382/103 |
| 5,983,147 A | | 11/1999 | Krumm | 701/45 |
| 6,026,340 A | | 2/2000 | Corrado et al. | 701/47 |
| 6,042,050 A | * | 3/2000 | Sims et al. | 244/3.17 |
| 6,266,593 B1 | * | 7/2001 | Seip et al. | 701/45 |
| 6,272,411 B1 | * | 8/2001 | Corrado et al. | 701/45 |
| 6,324,453 B1 | * | 11/2001 | Breed et al. | 701/45 |
| RE37,466 E | * | 12/2001 | Allen et al. | 280/735 |
| 6,362,850 B1 | * | 3/2002 | Alsing et al. | 348/239 |
| 6,370,260 B1 | * | 4/2002 | Pavlidis et al. | 382/103 |
| 6,397,136 B1 | * | 5/2002 | Breed et al. | 701/45 |

OTHER PUBLICATIONS

Barron, J.L., et al., "Systems and Experiment Performance of Optical Flow Techniques", *International Journal of Computer Vision*, vol. 12, No. 1, pp. 43–77 (1994).

Dempster, A.P., et al., "Maximum Likelihood from Incomplete Data via the EM Alogorithm," *Journal of Royal Statistical Society B*, vol. 39, No. 2, pp. 1–38 (1977).

Dyckhoff, Harald, et al., "Generalized Means as Model of Compensative Connectives", *Fuzzy Sets and Systems*, vol. 14, pp. 143–154 (1984).

Grandvalet, Y., et al., "Noise Injection: Theoretical Prospects", *Neural Computation*, vol. 9, pp. 1093–1108 (1997).

Krishnapuram, Raghu, et al., "Fuzzy–Set–Based Hierarchical Networks for Information Fusion in Computer Vision", *Neural Networks*, vol. 5, pp. 335–350 (1992).

Huttenlocher, Daniel P., et al., "Comparing Images Using the Hasudorff Distance", *IEEE Transactions on Pattern Analysis and Machine Intelligence*, vol. 15, No. 9, pp. 850–863 (1993).

Mao, Jianchang, et al., "Artificial Neural Networks for Feature Extraction and Multivariate Data Projection", *IEEE Transactions on Neural Networks*, vol. 6, No. 2, pp. 296–316 (Mar. 1995).

Paglieroni, David W., "Distance Transforms: Properties and Machine Vision Applications", *CVGIP: Graphical Models and Image Processing*, vol. 54, No. 1, pp. 56–74 (Jan. 1992).

Quinlan, J.R., "Decision Trees and Decisionmaking", *IEEE Transactions on Systems, Man and Cybernetics*, vol. 20, No. 2, pp. 339–346 (1990).

Rucklidge, William J., "Efficiently Locating Objects Using the Hausdorff Distance", *International Journal of Computer Vision*, vol. 24, No. 3, pp. 251–270 (1997).

\* cited by examiner

SENSOR FUSION ARCHITECTURE FOR VISION-BASED OCCUPANT DETECTION

FIELD OF THE INVENTION

This invention relates to object detection systems and methods. More specifically, the present invention relates to object detection systems and methods for detection and classification of objects for use in control of vehicle systems, such as air bag deployment systems, and other systems.

BACKGROUND OF THE INVENTION

Virtually all modern passenger vehicles have air bag deployment systems. The earliest versions of air bag deployment systems provided only front seat driver-side air bag deployment, but later versions included front seat passenger-side deployment. The latest versions of deployment systems now include side air bag deployment. Future air bag deployment systems will likely include protection for passengers in rear seats. Current air bag deployment systems generally deploy whenever there is a significant vehicle impact, and will deploy even if the area to be protected is not occupied or is occupied by someone not likely to be protected by the deploying air bag.

While thousands of lives have been saved by air bags, a large number of people have been injured and a few have been killed by the deploying air bag. Many of these injuries and deaths have been caused by the vehicle occupant being too close to the air bag when it deploys. Children and small adults are particularly susceptible to injuries from air bags. Also, an infant in a rear-facing infant seat placed on the right front passenger seat is in serious danger of injury if the passenger airbag deploys. The United States Government has recognized this danger and has mandated that car companies provide their customers with the ability to disable the passenger side air bag. Of course, when the air bag is disabled, full size adults are provided with no air bag protection on the passenger side.

Therefore, there exists a need to detect the presence of a vehicle occupant within an area protected by an air bag. Additionally, if an occupant is present, the nature of the occupant must be determined so that air bag deployment can be controlled in a fashion so as to not injure the occupant.

Various mechanisms have been disclosed for occupant sensing. Breed et al. in U.S. Pat. No. 5,845,000, issued Dec. 1, 1998, describe a system to identify, locate, and monitor occupants in the passenger compartment of a motor vehicle. The system uses electromagnetic sensors to detect and image vehicle occupants. Breed et al. suggest that a trainable pattern recognition technology be used to process the image data to classify the occupants of a vehicle and make decisions as to the deployment of air bags. Breed et al. describe training the pattern recognition system with over one thousand experiments before the system is sufficiently trained to recognize various vehicle occupant states. The system also appears to rely solely upon recognition of static patterns. Such a system, even after training, may be subject to the confusions that can occur between certain occupant types and positions because the richness of the occupant representation is limited. It may produce ambiguous results, for example, when the occupant moves his hand toward the instrument panel.

A sensor fusion approach for vehicle occupancy is disclosed by Corrado, et al. in U.S. Pat. No. 6,026,340, issued Feb. 15, 2000. In Corrado, data from various sensors is combined in a microprocessor to produce a vehicle occupancy state output. Corrado discloses an embodiment where passive thermal signature data and active acoustic distance data are combined and processed to determine various vehicle occupancy states and to decide whether an air bag should be deployed. The system disclosed by Corrado does detect and process motion data as part of its sensor processing, thus providing additional data upon which air bag deployment decisions can be based. However, Corrado discloses multiple sensors to capture the entire passenger volume for the collection of vehicle occupancy data, increasing the complexity and decreasing the reliability of the system. Also, the resolution of the sensors at infrared and ultrasonic frequencies is limited, which increases the possibility that the system may incorrectly detect an occupancy state or require additional time to make an air bag deployment decision.

Accordingly, there exists a need in the art for a fast and reliable system for detecting and recognizing occupants in vehicles for use in conjunction with vehicle air bag deployment systems. There is also a need for a system that can meet the aforementioned requirements with a sensor system that is a cost-effective component of the vehicle.

SUMMARY OF THE INVENTION

It is an object of the present invention to provide a fast and reliable system for detecting and tracking objects within a specified area that can be adapted for detecting and recognizing occupants within a vehicle to determine whether an airbag deployment system should be triggered or not. It is a further object of the present invention to provide for the use of Commercial-Off-The-Shelf (COTS) components within the invention to lower the cost of the deployment of embodiments of the invention. It is still another object of the present invention to provide that occupancy determination is made using multiple types of information extracted from the same set of sensors, thereby further reducing the cost of the deployment of embodiments of the invention.

The present invention provides a vision-based system for automatically detecting the position of objects (such as close to the instrument panel or away, etc.) as well as recognizing the type of object (such as an adult, child, empty seat, etc.). The method and system of the present invention provide this capability by recognizing the type of occupant and his position by combining different types of information extracted from a video stream generated by an imaging sensor, such as a solid-state CCD or CMOS vision sensor. The vision sensors of the present invention may view a scene that is lit only with ambient light, or additional light may be provided to adequately light the viewed scene. The different types of information extracted from the video stream are used to provide separate confidences as to occupant status. The present invention provides a sensor fusion architecture which optimally combines the confidence determinations made by a set of classifiers operating separately on edge, motion, and range information. The final classification decision is more accurate than that achieved by the classifiers separately.

An embodiment of the present invention provides a method of object detection comprising the steps of: capturing images of an area occupied by at least one object; extracting image features from the images; classifying the image features to produce object class confidence data; and performing data fusion on the object class confidence data to produce a detected object estimate. Classifying the image features may be accomplished through the use of classification algorithms, such as a C5 decision tree, a Nonlinear Discriminant Analysis network, a Fuzzy Aggregation Network, or a Hausdorff template matching process.

Another embodiment of the present invention provides a system for classifying objects, that comprises: means for capturing images of an area occupied by at least one object; means for extracting features from the images to provide feature data; means for classifying object status based on the feature data to produce object class confidences; and means for processing the object class confidences to produce system output controls. Means for capturing images of an area may comprise CMOS or CCD cameras, or other devices known in the art that allow digital images of a viewed area to be captured. Means for extracting features may comprise algorithms that process the digital images to allow edge features, motion features, or other features of the viewed images to be generated. Means for classifying object status may be implemented through the use of classification algorithms, such as a C5 decision tree, a Nonlinear Discriminant Analysis network, a Fuzzy Aggregation Network, or a Hausdorff template matching process. Means for processing the object class confidences may also be accomplished through the use of classification algorithms, such as a C5 decision tree, a Nonlinear Discriminant Analysis network, or a Fuzzy Aggregation Network.

Still another embodiment of the present invention provides an object detection software system providing control signals, where the object detection software system, when run on a suitable computer system, comprises: at least one imaging sensor for capturing images of an area and providing digital representations of said images; at least one image feature extractor module receiving said digital representations and providing image features; at least one image feature classifier module receiving said image features and providing object class confidences; and a sensor fusion engine receiving said object class confidences and providing control signals. The imaging sensors may comprise CMOS or CCD cameras, or other devices known in the art that allow digital images of a viewed area to be captured. The image feature extractor modules may comprise algorithms that process the digital images to allow edge features, motion features, or other features of the viewed images to be generated. The image feature classifier module may comprise classification algorithms, such as a C5 decision tree, a Nonlinear Discriminant Analysis network, a Fuzzy Aggregation Network, or a Hausdorff template matching process. The sensor fusion engine may also comprise classification algorithms, such as a C5 decision tree, a Nonlinear Discriminant Analysis network, or a Fuzzy Aggregation Network.

The present invention is not limited to simple enable/disable commands to airbag deployment systems. The present invention may be adapted to provide additional airbag controls, such as those used with "smart" airbags where an airbag may be commanded, for example, to deploy at half-strength. The present invention may also be used to provide control over seat-belt deployment systems, vehicle climate control, or other vehicle systems where occupancy status influences the system.

Due to the versatility and robustness of the present invention, the present invention may also be applied to other broad application areas such as surveillance and event modeling. For surveillance, the present invention may be used to detect the presence of a small child in the vicinity of a pool, the presence of a person in a secure area, or the presence of a large vehicle for an extended period of time outside a government building. For event modeling, other embodiments of the present invention could detect and track an object across multiple images and identify the type of action being performed.

DETAILED DESCRIPTION OF PREFERRED EMBODIMENTS

I. Overview

Figure 1:
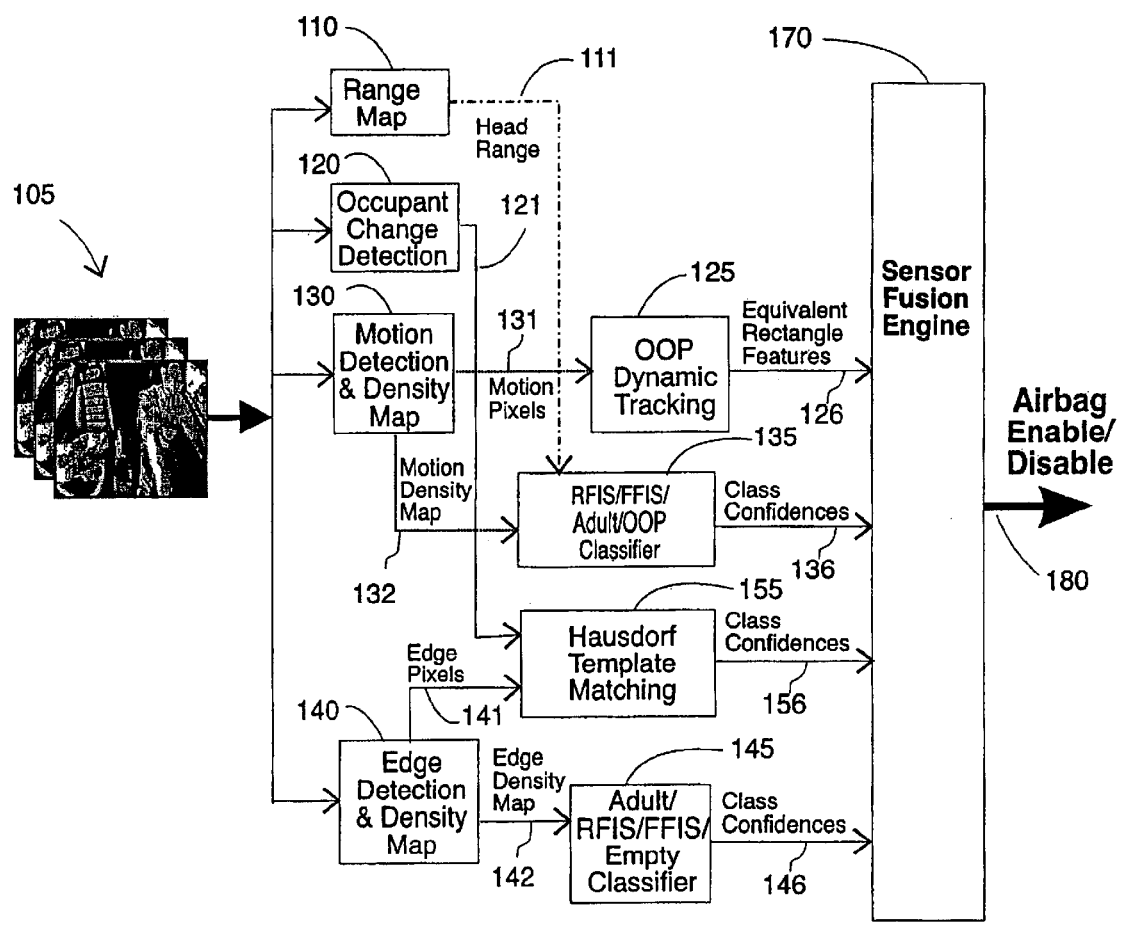
FIG. 1 depicts a block diagram of the object detection system provided by the present invention.

A block diagram for the preferred embodiment of the object detection and tracking system provided by the present invention is shown in FIG. 1. In general, the present invention extracts different types of information or "features" from the stream of images 105 generated by one or more vision sensors. Feature extraction modules 110, 120, 130, and 140 receive and process frames from the stream of images 105 to provide feature data 111, 121, 131, 132, 141, 142. Classifier modules 135, 145, 155 operate on the feature data to classify the occupant into one of a small number of classes, such as adult in normal position or rear-facing infant seat, while a tracker module 125 operates on the feature data to determine occupant position. Each classifier 135, 145, 155 generates a class prediction and confidence value 136, 146, 156 and the tracker 125 generates occupant positional data 126. The predictions and confidences of the classifiers are then combined in a sensor fusion engine 170 which makes the final decision to enable or disable the airbag. Because the sensor fusion engine combines the "votes" of the classifiers in an optimized manner, the final decision accuracy is higher than can be achieved using any of the individual features and classifiers.

Use of vision sensors in the preferred embodiment of the present invention provides that the benefits of sensor data fusion can be realized using a single set of sensors because very different features can be generated from the same stream of images. For reasons of low cost, flexibility, compactness, ruggedness, and performance the preferred imaging sensor is a CCD or CMOS imaging chip. CMOS vision chips, in particular, have many advantages for this application and are being widely developed for other applications. A large variety of CMOS and CCD vision sensors may be used in the preferred embodiment. The FUGA Model 15d from Fill Factory Image Sensors and Mitsubishi's CMOS Imaging Sensor chip are two examples of imaging sensor chips that may be used in the preferred embodiment of the present invention. The FUGA chip provides a logarithmic response that is particularly useful in the present invention. The LARS II CMOS vision sensor from Silicon Vision may also be used, especially since it provides pixel-by-pixel adaptive dynamic range capability.

The preferred embodiment of the present invention uses ambient lighting, such as sun light, to provide adequate lighting for the vision sensors to view the occupant area of a vehicle. However, at night in other situations when the ambient light is not sufficient, one or more active illumination sources may be used to provide adequate lighting for the occupant area. The active illumination sources may be provided by internal lights located in or around the rear-view mirror, on an overhear console, in the dashboard, in the car doors, or at other appropriate places in the vehicle. Other embodiments of the present invention may use sensors that sense infrared radiation or other frequencies of electromagnetic radiation, such that the need for external illumination sources is reduced or eliminated.

As shown in FIG. 1, the feature extraction modules produce four types of features utilized in the preferred embodiment. A Range Map module 110 produces head range data 111 obtained by using two vision sensors in a triangulation mode. A Motion Detection module 130 produces motion pixels 131 and a motion density map 132. An Edge Detection module 140 produces edge pixels 141 and an edge density map 142. An Occupant Change Detection module 120 provides an occupant change indication 121 when a large change in the scene occurs, such as when a new occupant enters the car. These modules can be implemented by separate hardware processing modules executing the software required to implement the specific functions, or a single hardware processing unit can be used to execute the software required for all these functions. Application specific integrated circuits (ASICs) may also be used to implement the required processing.

The feature data is then provided to classifier modules and tracking modules. In the preferred embodiment as shown in FIG. 1, three classifier modules are used. The Edge Density Classifier 145 processing edge density map data 142 produces classification values 146 for four classifications: adult in normal or twisted position, adult out-of-position (OOP), rear-facing infant seat (RFIS), front-facing infant seat (FFIS). The Motion Density Classifier 135 processing motion density map data also produces classification values 136 for the same four classifications. The template matching classifier 155 produces classification values 156 for three classifications: two types of rear-facing infant seats and a front-facing infant seat. All of the classifiers 125, 135, 145 have low computational complexity and have high update rates, except for the template matching classifier 155. The template matching classifier 155 is therefore triggered only when an occupant change event occurs. The preferred embodiment also uses an OOP dynamic tracking module 125 based on motion features which is used to rapidly detect out-of-position occupants who are too close to the airbag. The details of the feature extraction modules, their associated classifiers, the dynamic tracking module, and the sensor fusion engine are described below.

In the preferred embodiment of the present invention, one or more vision sensors are positioned on or around the rear-view mirror, or on an overhead console. Positioning the vision sensors in these areas allows positions of both the driver and front seat passenger or passengers to be viewed. Additional vision sensors may be used to view passengers in rear seats or to particularly focus on a specific passenger area. The vision sensors are fitted with appropriate optical lens known in the art to direct the appropriate portions of the viewed scene onto the sensor.

II. Occupant Change Detection

In an occupant sensing system for automotive applications one of the key events is represented by a change in the seat occupant. A reliable system to detect such occurrence will thus provide some additional amount of information to be exploited to establish the occupant type. If it is known with some degree of accuracy, in fact, that no major changes have occurred in the observed scene, such information can be provided to the system classification algorithm as an additional parameter. This knowledge can then be used, for example, to decide whether a more detailed analysis of the scene is required (in the case where a variation has been detected) or, on the contrary, some sort of stability in the occupant characteristics has been reached (in the opposite case) and minor variations should be just related to noise.

The Occupant Change Detection module implements the processing necessary to detect an occupant change event. The processing provides the capability of sensing major variations in a scene based on an estimation of the image second order statistics. The Occupant Change Detection module detects stationary shifts in the scene statistical parameters while avoiding unwanted triggering due to transient changes.

Figure 2:
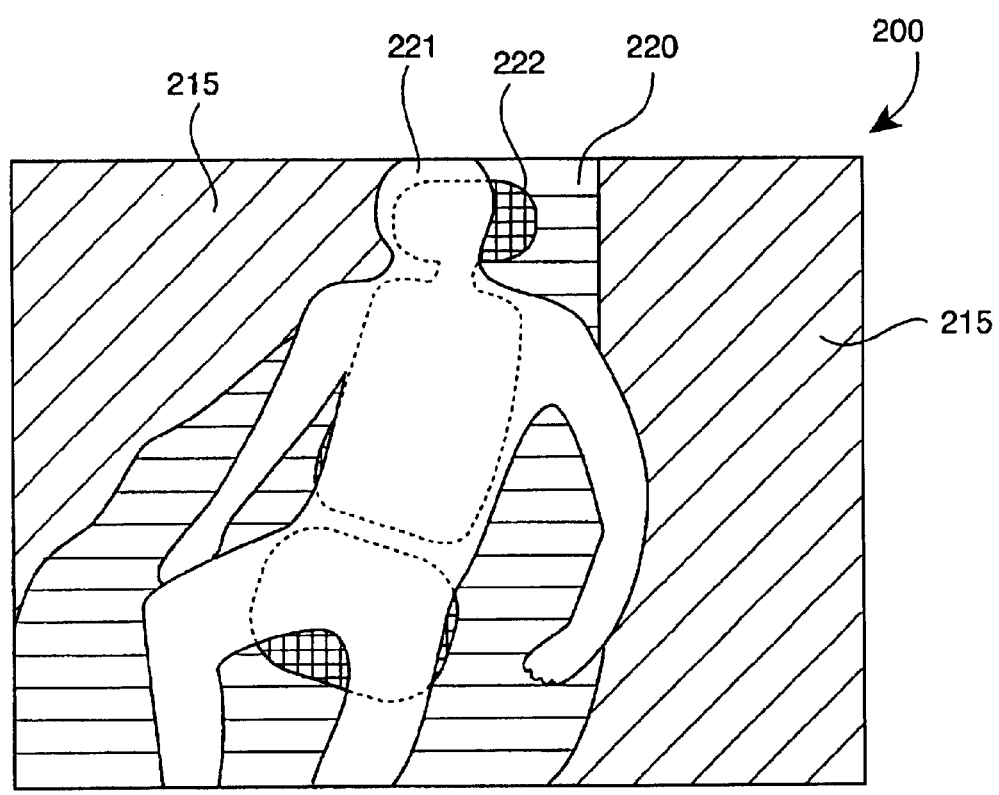
FIG. 2 depicts the partitioning of an image for detecting the presence of an occupant.

The image variance is computed on a region of interest tailored around a specific area where an occupant is more likely to be present. In FIG. 2 an example of a masked image is depicted. As shown in FIG. 2, an image 200 is partitioned into areas 220 where an occupant is likely to be present and areas 215 where an occupant is likely not to be present. An individual 221 positioned in a car seat 222 will fill a large portion of the area 220 where an occupant is likely to be present. The image variance computed in N successive frames is used to build a damped moving average (DMA) model. This model differs from a conventional moving average (MA) model in the fact that a damping factor $\lambda$ is introduced to weight differently the variances sampled in different instants.

The current estimate of the DMA model, $\sigma^{(d)}$ is computed according to the expression:

$$\sigma_i^{(d)} = \frac{1-\lambda}{1-\lambda^N} \sum_{i=0}^{N-1} \lambda^i \sigma^{-i}$$

where $\lambda$ usually assumes values in the range [0.75,0.95]. The function of the damping factor is clearly that of weighting the most recent entries in the variance history more than the older ones. When a new frame {i} is acquired the variance $\sigma_i$ of the image is computed and it is used to update the DMA value. The $\sigma^{(d)}$'s are also stored in a vector, which holds the last M values it assumed.

An occupant change is detected when a stationary shift in the estimated moving average is measured. A threshold $\tau$ has to be selected in order to determine the sensitivity of the algorithm. The threshold simply determines what is the minimal percentage of variation that will trigger the algorithm:

$$d = \frac{|\sigma_0^{(d)} - \sigma_{-N+1}^{(d)}|}{\sigma_{-N+1}^{(d)}} \geq \tau$$

Figure 3:
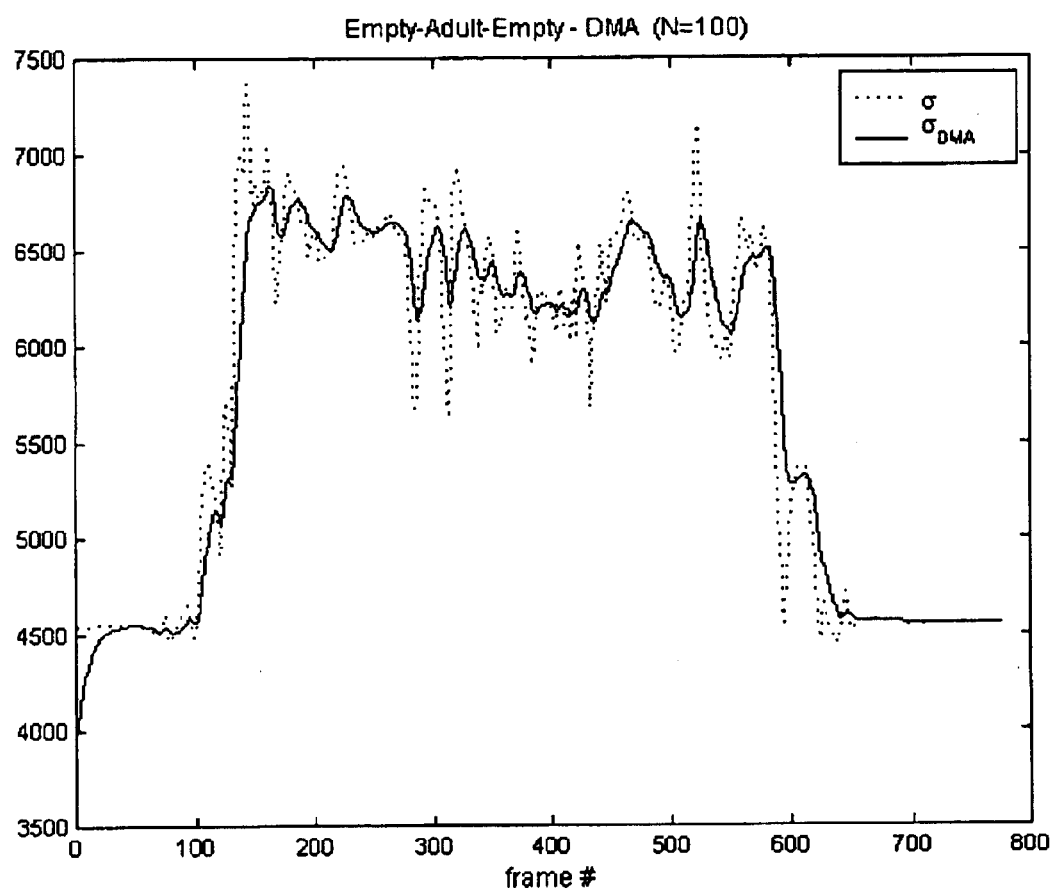
FIG. 3 shows a graph of the moving average when an occupant enters and then leaves an image of the occupancy area of a vehicle

Experimental estimations revealed that variations in the second order statistics larger than 15%–20% occurred when the seat occupant was changed. An example of an occupant shift event is presented in FIG. 3 where the instantaneous image variance and the corresponding estimated damped moving average are represented.

In the preferred embodiment of the present invention, occupant change detection is used to trigger the Hausdorff template matching algorithm, which is discussed below. The occupant change detection trigger is used with the Hausdorff template matching algorithm due to the high computational requirements of the algorithm. However, occupant change detection may be used to trigger other computational processes that require knowledge of a major change in the occupancy status of an observed area. Occupant change detection may also be used to trigger other vehicle control systems, such as vehicle interior lights or temperature control system.

III. Occupant Out of Position Detection

One of the main tasks performed by an active airbag control system is to evaluate dynamically when exactly the airbag should be deployed. This turns out to be a critical issue since it is a known fact that a delay in the airbag activation is likely to result in a fatal injury if the occupant is allowed to get too close to the dashboard prior to the deployment. In the present invention, occupant out of position (OOP) detection is provided by the Range Map module 110 and the OOP Dynamic Tracking module 125.

The present invention implements a method of detecting when an occupant is out of position with a vision based algorithm capable of estimating the occupant position in real time and then tracking dynamically his head. This method is based on motion estimation and range computation using a stereo imager system. This method relies upon the fact that the region of the image the head is likely to occupy when the occupant is sitting in a normal position is known with some degree of accuracy. Being a very mobile part of the body, it is relatively easy to track the head as opposed to other parts, like the torso or the legs.

On the other hand, for the same reason, it is relatively easy to lose the head track and start tracking the occupant's hands because of their even higher mobility. To overcome this problem a simplified stereo vision system is used, which estimates the range value in a region of interest located approximately over the head rest area. Through the evaluation of the range measurements it is thus possible to detect those cases when the wrong object is tracked. When the head is tracked correctly, in fact, a movement toward the OOP (out of position) area will be accompanied by an increase in the range value measured over the head rest area, as a consequence of the disappearance of the occupant's head in that region. On the other hand, when the hands are falsely tracked such a variation does not take place.

The stereo imaging system used in the preferred embodiment of the present invention is provided by deploying two vision sensors at a fixed distance apart. For viewing the front portion of a vehicle occupancy area, the sensors may be located at or around the interior rear view mirror, overhead console, or any other area that provides views of the front passenger area and/or the driver area. Use of two sensors viewing the same general area provides the ability to measure the depth of objects and surfaces in the area. The disparity or shift of matching pixels between the images viewed by the two sensors allows the depth and range of an imaged surface to be calculated from the imaging geometry. As indicated above, the range and depth measurements are localized to image patches corresponding to the head rest area of the vehicle. In the preferred embodiment of the present invention, a single range value for the range to the headrest area is provided.

Figure 4:
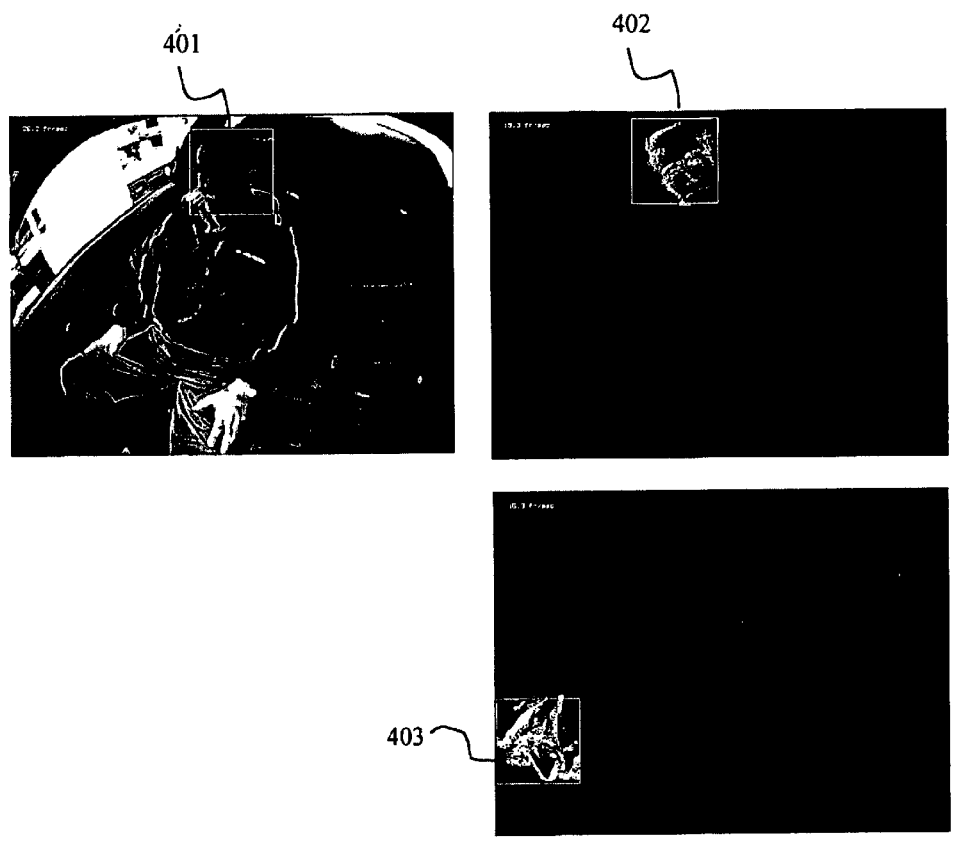
FIG. 4 depicts the placement of a rectangle for a region of interest for head tracking, and the movement of that rectangle during head tracking.

The tracking procedure itself is based on estimating the motion inside a rectangular region of interest. (See section V below for details on how motion is detected.) For head tracking, motion is first measured within a rectangular "window" near the headrest. Assuming that such region is correctly initialized, i.e., it is initially placed over the occupant's head, its coordinates are updated by estimating the centroid of the rectangle equivalent to the thresholded motion image computed in the region. The new coordinates will be then used in the next frame to re-estimate the rectangle position. FIG. 4 depicts the initial placement of the region of interest 401 within the image 400 and two frames of head tracking 402, 403.

Once the binary motion map has been computed inside the region of interest, the image moments are calculated as follows:

$$m_{00} = \sum_{xy} I(x, y) \quad m_{10} = \sum_{xy} xI(x, y) \quad m_{01} = \sum_{xy} yI(x, y)$$

The equivalent rectangle centroid is then calculated from the image moments as follows:

$$C_x = \frac{m_{10}}{m_{00}} \quad C_y = \frac{m_{01}}{m_{00}}$$

The size of the tracking block, i.e., rectangular "window," is kept constant.

As the occupant moves within the vehicle, the centroid of the motion pixels is used to track the occupant head motion by updating the position of the rectangular window. As the occupant moves his head toward the dashboard, the window will track it. As discussed above, the range to the headrest area is used to ensure that the head is being tracked, rather than some other feature of the occupant, such as hands. If the occupant moves to an OOP position, thereby uncovering the headrest area, the range reading would indicate the range for the headrest area. This range reading would indicate that the occupant's head is not near the headrest area. This information combined with the position of the rectangular window would indicate an OOP situation.

IV. Edge Detection and Density

In the preferred embodiment of the present invention, the Edge Detection & Density Map module 140 provides data to the Edge Classifier module 145 which then calculates class confidences based on image edges. Edges have the important property of being less susceptible to illumination changes. Furthermore, with the advent of CMOS sensors, edge features can be computed readily on the sensor itself. A novel and simple approach is used to derive occupant features from the edge map.

Figure 5:
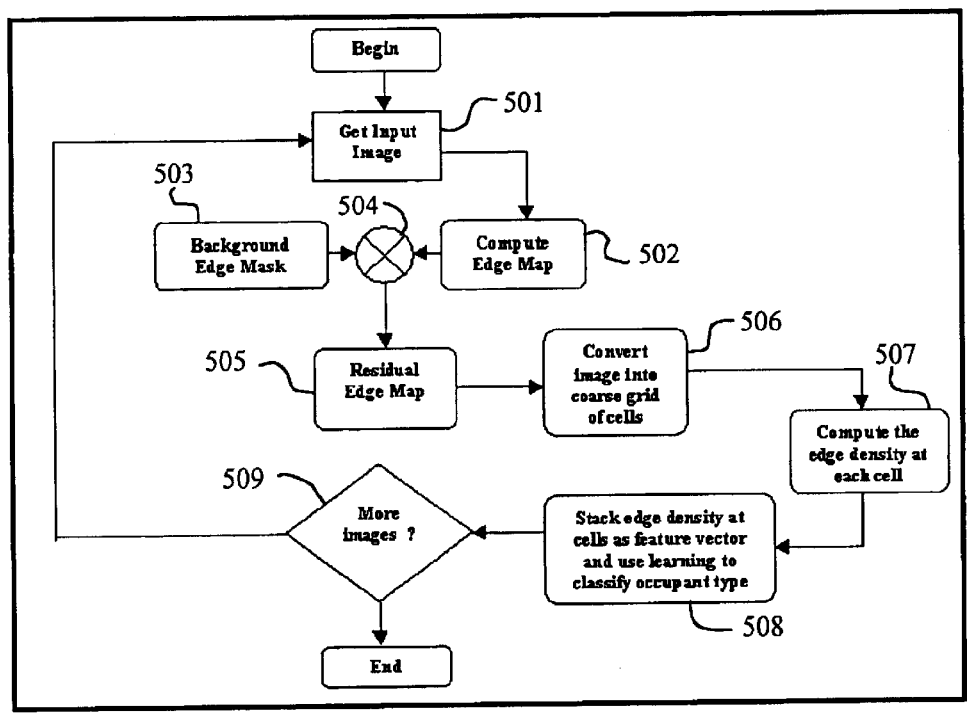
FIG. 5 shows a flow chart for occupant classification based on image edges.

The flowchart shown in FIG. 5 shows the steps required to derive occupant features from image edges. Block 501 represents the acquisition of a new input image. Block 502 represents the computation of an edge map for this image. As indicated above, CMOS sensors known in the art can provide this edge map as part of their detection of an image.

Figure 6:
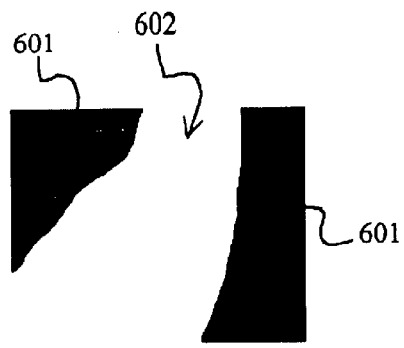
FIG. 6 shows an example background mask used for detecting important pixel positions.

Block 503 represents the creation of a background mask image. This mask image is created to identify pixels in the image that are important. FIG. 6 shows a representative mask image for the front passenger side seat. In FIG. 6, the unimportant edges are marked by areas 601 shown in black while the important edges are marked by areas 602 shown in white.

Operation 504 represents the masking of the edge map with the mask image to identify the important edge pixels from the input image. Block 505 represents the creation of the residual edge map. The residual edge map is obtained by subtracting unimportant edges (i.e., edges that appear in areas where there is little or no activity as far as the occupant is concerned).

Figure 7:
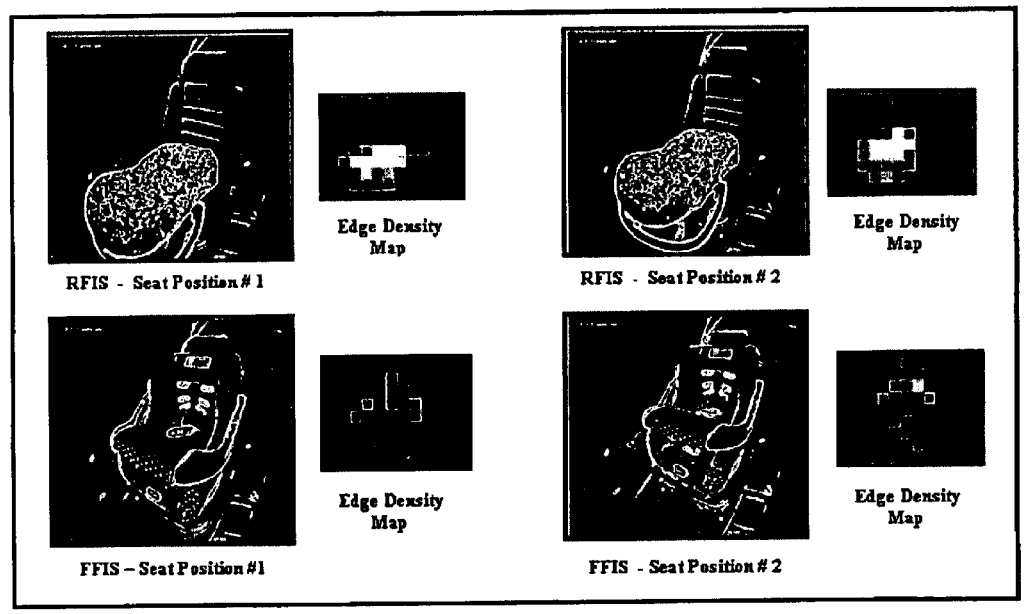
FIG. 7 shows edge pixels and edge density maps for different types of infant seats.

The residual edge map can then be used to determine specific image features. Block 506 represents the conversion of the residual image map into a coarse cell array. Block 507 represents the computation of the density of edges in each of the cells in the coarse array using the full resolution residual edge map. The edge density in the coarse pixel array is then normalized based on the area covered by the edges in the residual edge map by the coarse pixel. A few examples of the resulting edge density map are shown in FIG. 7 for different occupants and car seat positions. Notice that the edge density map for RFIS (rear-facing infant seat) at two different car seat positions are more similar in comparison to the edge density maps for the FFIS (front-facing infant seat) at the same car seat positions.

Block 508 represents the extraction of features (e.g., 96 for a 12×8 array) from the coarse pixel array. The edge densities of each cell in the edge density map are stacked as features. The features are provided by a feature vector formed from the normalized strength of edge density in each cell of the coarse cell array. The feature vector is then used by a classification algorithm (such as the C5, NDA and FAN algorithms discussed below) to classify the occupant into RFIS, FFIS, Adult in normal position or Adult out-of-position. Block 509 represents the iteration of the algorithm for additional images according to the update rate in use.

In the preferred embodiment of the present invention, the C5 decision tree method is used as the classification algorithm. Decision tree methods are well known in the art. These methods, such as C5, its predecessor C4.5 and others, generate decision rules which separate the feature vectors into classes. The rules are of the form IF F1<T1 AND F2>T2 AND . . . THEN CLASS=RFIS, where the F's are feature values and T's are threshold values. The rules are extracted from a binary decision tree which is formed by selecting a test which divides the input set into two subsets where each subset contains a larger proportion of a particular class than the predecessor set. Tests are then selected for each subset in an inductive manner, which results in the binary decision tree. Each decision tree algorithm uses a different approach to selecting the tests. C5, for example, uses entropy and information gain to select a test. Eventually each subset will contain only members of a particular class, at which point the subset forms the termination or leaf of that branch of the tree. The tests are selected so as to maximize the probability that each leaf will contain as many cases as possible. This will both reduce the size of the tree and maximize the generalization power. The tests used with the edge detection features are further discussed in section X.

V. Motion Detection and Density

In the preferred embodiment of the present invention, the Motion Detection & Density Map module 130 provides data to the Motion Classifier module 135 which then calculates class confidences based on image motion. Predominantly, motion information in computer vision is extracted using optic flow computation, as described by J. L. Barron et al. in "Performance of Optical Flow Techniques," International Journal of Computer Vision, vol. 12, no. 1, pp. 43–77, 1994. While optical flow computation methods are accurate, they are computationally expensive to implement for occupant position detection due to fast time response requirements. Furthermore, the accuracy provided by optical flow methods is not necessary for occupant detection. The present invention implements a simple motion extraction procedure. The motion image $I_{mot}(x,y)$ at pixel (x,y) is computed as a differential measure on three successive image frames $F_0$, $F_{-1}$, $F_{-2}$,:

$$I_{mot}(x, y) = \begin{cases} 1 & \text{if} |F_0(x, y) - F_{-1}(x, y)| \cdot |F_{-1}(x, y) - F_{-2}(x, y)| \geq \tau \\ 0 & \text{otherwise} \end{cases}$$

Figure 8A:
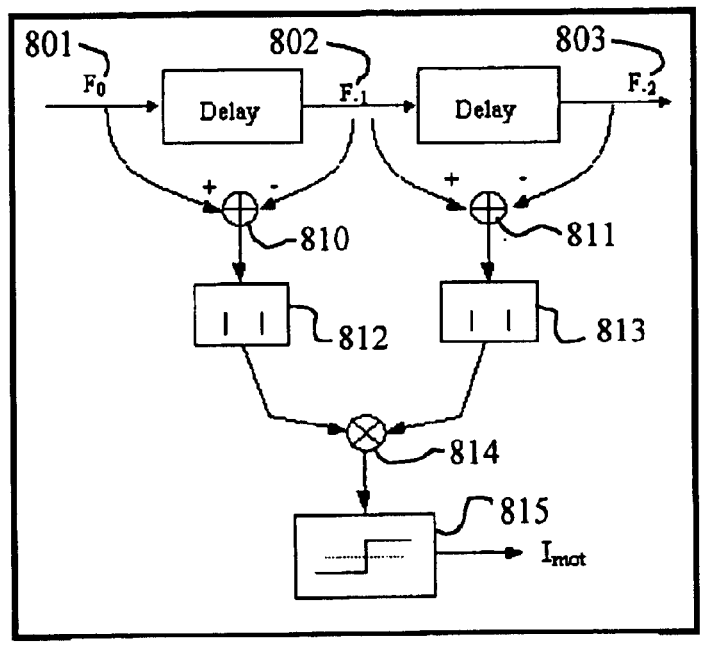
FIG. 8A shows a block diagram for calculating motion pixels.
Figure 8B:
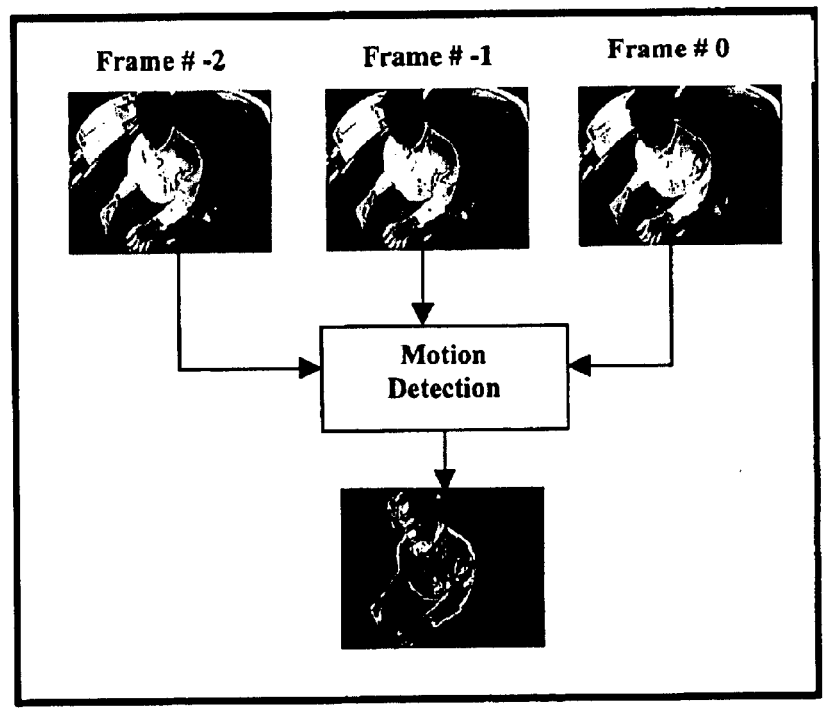
FIG. 8B depicts the motion pixels detected from successive image frames.

The block diagram shown in FIG. 8A illustrates the computation used for motion detection. In FIG. 8A, the pixel values of the current image 801, the most recent previous image 802, and second most recent previous image 803 are stored. Operation 810 represents the subtraction of the previous image 802 from the current image 801 at each pixel position. Operation 812 represents the calculation of the absolute value of the subtraction operation. Similarly, operation 811 represents the subtraction of the second most recent image 803 from the most recent image 802 at each pixel position. Operation 813 represents the calculation of the absolute value of that subtraction operation. Operation 814 represents the multiplication of the outputs of the two absolute value calculations. Operation 815 represents the thresholding performed at each pixel position to determine motion edges. An example of the calculation of edges from motion detection is shown in FIG. 8B.

Motion information is processed by the extraction of a set of features from a motion density map. The motion density map is computed in exactly the same fashion as the edge density map. The key difference is that the motion pixels for motion density map computation are based on the motion detection procedure outlined above. The normalized strength of motion density in each grid in the coarse motion density map cell form the feature vector. In the preferred embodiment of the present invention, the head range is also provided as an additional feature used in classification. These features are used to classify the input data into RFIS, FFIS, adult-normal/twisted and adult out-of-position classes using NDA, C5 and FAN algorithms as discussed below.

In the preferred embodiment of the present invention, the motion pixels are generated by processing hardware external to the vision sensor used to observe a scene. This design decision is motivated by the apparent unavailability of commercial sensors which integrate motion detection with the vision sensor (unlike the commercial sensors previously discussed which can provide edge pixels). However, alternative embodiments of the present invention accommodate the generation of motion pixels directly within the vision sensor.

In the preferred embodiment of the present invention, an NDA network is used to generate class confidences from the motion density information. NDA refers to a Nonlinear Discriminant Analysis network and can be used to perform nonlinear pattern classification as described in Mao, J., and Jain, A. K., in "Artificial Neural Networks for Feature Extraction and Multivariate Data Projections," IEEE Transactions on Neural Networks, vol. 6, no. 2, March 1995. The NDA network is a multilayer neural network with typically four layers. The first layer is the input layer and has the same number of nodes/neurons as the number of input features.

The fourth layer is the output layer and contains the number of classes as output nodes. The two layers in between are called hidden layers of the network. While the number of nodes in the first hidden layer is variable and is decided on a trial and error basis, the second hidden layer is restricted to either two or three nodes. The NDA network essentially implements a nonlinear projection of the high dimensional input space into a two/three dimensional space corresponding to the outputs of the two or three hidden layer nodes in the second hidden layer. The outputs of the second hidden layer are then used to arrive at a classification decision at the output layer.

The nodes between the any two layers are connected by links called weights. These weights are derived using a training process wherein data in the form of inputs and the corresponding outputs are presented to the network from a data set called the training set. An optimization process based on gradient search algorithm is then used to arrive at those weights that best separates all the classes present in the training set. The network is then evaluated with a test set that consists of data not present in the training set. The degree to which an input belongs to a class is determined by the closeness of the output prediction to the class prototype. For example, if the class prototype for a single output neural network is 0.9 and the prediction is 0.8, then a confidence of 89% (i.e., |0.9−0.8|*100/0.9) is assigned to the prediction. The tests used with the motion detection features are further discussed in section VIII.

VI. Hausdorff Template Matching

In addition to the Edge Classifier module, another module in the preferred embodiment of the present invention uses edge information to specifically recognize all rear-facing infant seat (RFIS) and front-facing infant seat (FFIS) type of occupants. The Template Matching module recognizes these occupant types using a fuzzy template matching method. In this approach, fuzzy or approximate templates of occupants are constructed from the edges that form the outline of the occupant. To recognize the occupant in a car, edges are extracted from an image of the occupant. Fuzzy templates of occupants are matched to the edges in the image using the Hausdorff distance metric which essentially measures the Euclidean distance between the edges of the fuzzy template placed at a given location in the image and the nearest edges (in position) from the image. In order to improve its robustness to noise and loss of edges due to illumination, occlusions, etc., the Hausdorff distance allows for incomplete or partial matches. Also, the fuzzy templates are transformed in an offline manner at each pixel location in the image to account for variability found in occupants such as a big RFIS, small RFIS, etc. The occupant type is classified based on the template with the lowest Hausdorff distance among all the stored templates. Templates for adults and children can also be defined.

The key advantages of this approach are that it is invariant to seat position and variations in texture caused by different types of seats or clothing of occupants. It is also robust to illumination changes since it works on edges. Computational complexity of the algorithm is reduced by only using three measures. The first measure is to use an object-specific set of transformations while searching for the best match template. For example, a rear-facing infant seat will only be found at the bottom portion of a passenger seat. In this case, only appropriate transformations of the RFIS template are allowed. So, an object-specific set of transformations can be created from this a priori knowledge and this step cuts down the search time during matching. The second measure is to allow for transformations in the current frame that are small perturbations to the transformation used in the previous frame. This step takes advantage of implicit inertia in the occupant given that the Template Matching module is searching for RFIS and FFIS occupant types only.

The third measure is to use a distance transform to compute the Euclidean distance during the Hausdorff distance metric computation. The distance transform helps to perform the metric computation with O(n) complexity by converting the distance computation into a look-up table. In the Template Matching module of one embodiment of the present invention, two fuzzy templates for RFIS and one for FFIS are used. The degree of match is used as the confidence of the module for an RFIS or FFIS occupant. The complete sequence of steps during the fuzzy template matching process is also summarized in the form of a flowchart in FIG. 9.

Figure 9:
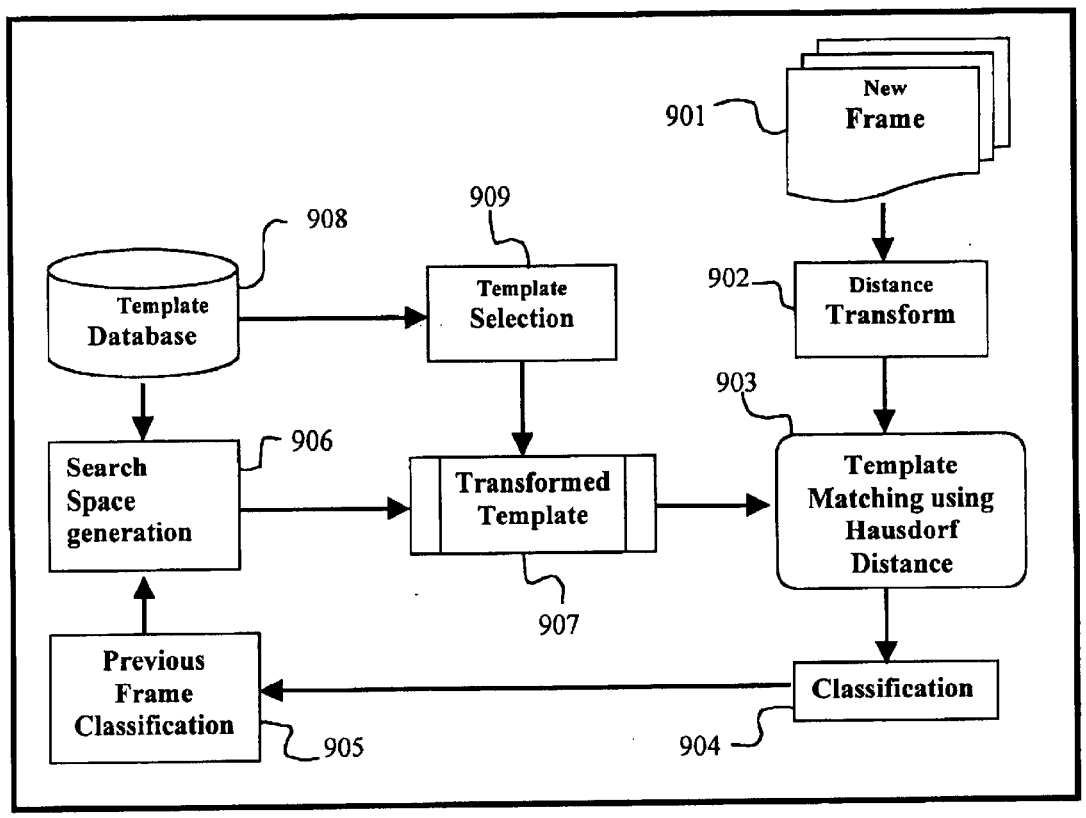
FIG. 9 shows a flow chart for occupant classification based on fuzzy template matching.

In the flowchart shown in FIG. 9, every new image frame 901 is collected and the distance transform step 902 is applied on the image to compute the Euclidean distance during the Hausdorff distance computation. (See Rucklidge, W. J., "Efficiently Locating Objects Using the Hausdorff Distance," International Journal of Computer Vision, vol. 24, no. 3, pp. 251–270, 1997.) The distance transform helps to perform the metric computation by converting distance computation into a lookup table, thereby resulting in substantial savings in computational cost. Using the distance transform output, the Hausdorff distance based template matching step 903 is performed based on selected set of user defined templates 909 as defined in a database 908. When the Hausdorff distance module is triggered for the first time, all possible transformations 907 are applied to the selected templates and each template is then matched with the input image using the Hausdorff distance metric. The classification step 904 classifies the input image into one of a specified group of classes (such as RFIS or FFIS) if the match is significantly high. Classification into a specific class occurs when the Hausdorff distance between the template for that class and the template in the input image is below a threshold. For each subsequent image frame, the classification decision for the prior frame 905 is used as feedback to constrain the set of transformations 907 necessary to achieve similar matches. This is based on the assumption of inherent inertia in the status of the occupant between any two consecutive image frames.

Figure 10:
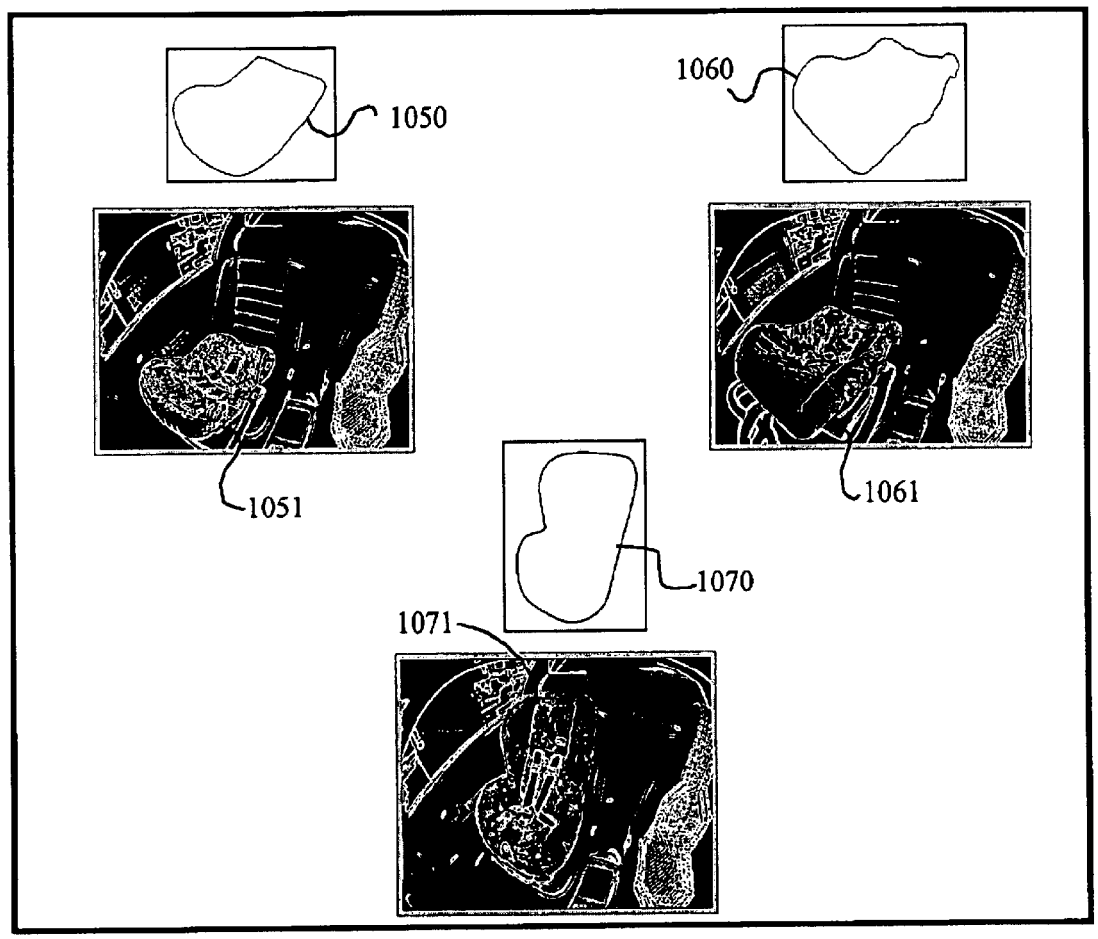
FIG. 10 depicts the fuzzy templates obtained from different types of infant seats.

Examples of the fuzzy templates created for Hausdorff matching are shown in FIG. 10. In FIG. 10, one rear-facing infant seat template 1050 corresponds to the rear-facing infant seat 1051 edges shown. Another rear-facing infant seat template 1060 is created from the edges of a different style of rear-facing infant seat 1061. A front-facing infant seat template 1070 is created from the edges of a front-facing infant seat 1071.

As previously discussed, the output from the occupant change detection module is used as a trigger to initiate the Hausdorff template matching module. The Hausdorff template matching process is computationally intensive compared to the remaining modules and hence is used only if there is a significant change in the occupant status as detected by the occupant change detection module. In the embodiment of the present invention reduced to practice, the Hausdorff template matching module is only used to verify if the occupant type is RFIS or FFIS. However, templates could also be created for other classes such as Adult and Small Child.

VII. Sensor Fusion

Each of the three classification modules, Hausdorff Template Matching, Edge Density Classifier and the Motion Density Classifier, produce class confidences for specified occupant types. The class confidences produced by each individual module could be used to produce an estimate of the presence of a particular type of occupant or to produce an occupant-related decision, such as airbag enable or disable. However, overall performance of the system is improved by aggregating and evaluating the class confidence values produced by the individual modules. Processing such aggregated data is known in the art as sensor or data fusion.

Sensor fusion as provided by the present invention operates by effectively fusing the class confidence values obtained from the three modules, namely Template Matching, Edge Density Classifier and the Motion Density Classifier, to generate an airbag enable/disable decision. As previously discussed, in the exemplary embodiment of the present invention, the Template Matching module provides three outputs, the first two correspond to outputs of the RFIS template matching scores and the last corresponds to the FFIS template matching score. The Edge Density Classifier module uses C5 decision rules to generate class confidences for RFIS, OOP, ADULT_NT and FFIS. The Motion density classifier uses an NDA network to generate class confidences for RFIS, OOP, ADULT_NT and FFIS. Preferably, the combined 11-dimensional input vector is then fed as input to a Fuzzy Aggregation Network (FAN). The equivalent rectangle features from the OOP Dynamic tracking module may also be provided to the FAN. The FAN then fuses the information by aggregating the class confidences and propagating it through a hierarchical network to produce an estimate of a particular occupant type or to generate a system control decision, such as a final airbag enable/disable decision.

Fuzzy aggregation networks have been widely employed to fuse information from multiple modalities. A FAN generates degrees of satisfaction of different criteria and aggregates the memberships in a hierarchical network. The nature and parameters of the connectives at each node are learned through a simple back-propagation learning procedure. Aggregation networks also provide a mechanism for selecting important features and discarding irrelevant or superfluous ones. Fuzzy aggregation networks differ from multi-layer perceptrons in many ways. The main difference is that the activation function used at each node is not the usual sigmoid function but instead one of the many fuzzy set connectives. Fuzzy set aggregation connectives are employed for integrating membership functions corresponding to the input features. Although several attractive fuzzy set connectives exist, the exemplary embodiment of the present invention uses the Generalized Mean (GM) operator for fusing the information at each node.

The GM operator g ( ) is defined as given below:

$$g(x_1, x_2, \ldots x_n) = \left(\sum_{i=1}^{n} w_i x_i^p\right)^{1/p}$$

where $x_i$ are the input values and $w_i$ are the corresponding weights. In the above equation, p determines the behavior of the Generalized Mean operator. The mean value always increases with an increase in p. All values between a minimum and a maximum can be obtained by varying the value of p between $-\infty$ and $+\infty$. Thus, in the extreme case, the GM operator can be used as union or intersection. Also, it can be shown that p=$-1$ gives the harmonic mean, p=0 gives the geometric mean, and p=+1 gives the arithmetic mean. The use of the GM operator at the nodes permits the partitioning of data in the input space using super-quadrics instead of the usual hyper-planes used with multi-layer perceptrons.

Figure 11:
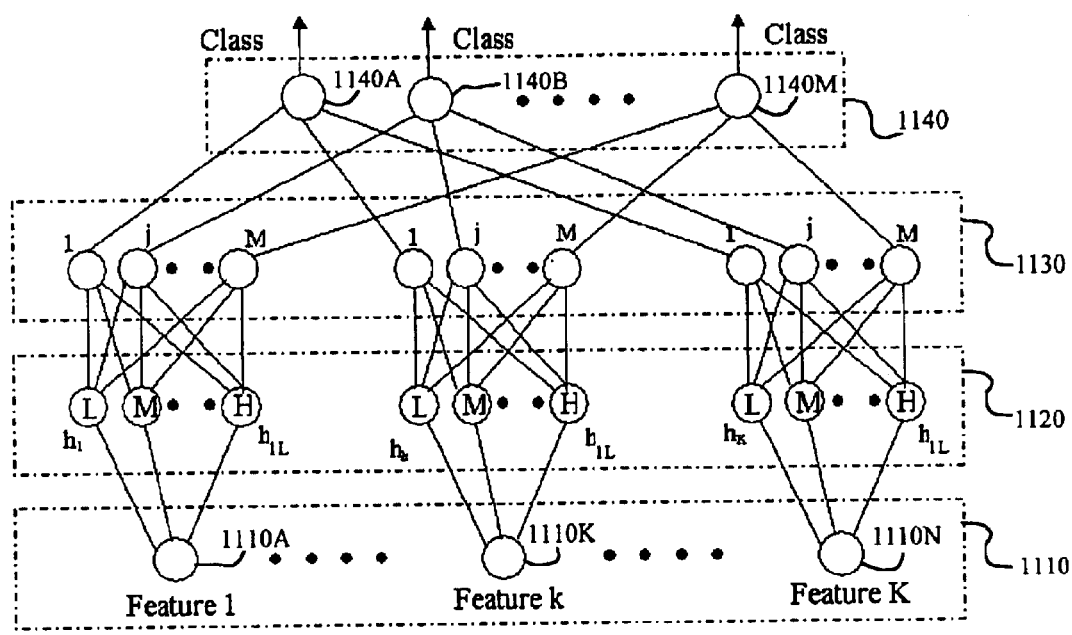
FIG. 11 depicts the network architecture of a fuzzy aggregation network.

The architecture of a typical FAN is shown in FIG. 11. The FAN as used in the sensor fusion engine of the exemplary embodiment of the present invention engine has four layers. The first layer is the input feature layer 1110. The second layer is the linguistic quantization layer 1120. In this layer, each of the features is transformed into a fuzzy linguistic term. This linguistic quantization of the input space assists in generating an intuitive interpretation to the trained network. The third layer is the linguistic fusion layer 1130. This layer tries to determine optimal ways to fuse the linguistic quantizations corresponding to each feature. The output layer 1140 tries to optimally learn different ways of combining the different features. The input layer nodes 1110A . . . 1110N equal the number of input features d, the output layer nodes 1140A . . . 1140M depend on the number of classes c. The number of units in the linguistic quantization layer 1120 depends on the granularity or quantization of each feature. The third layer or linguistic fusion layer 1130 consists of cd nodes.

An important issue is the linguistic quantization step. This step involves partitioning each feature so that it can be interpreted linguistically, e.g., RFIS is High, or ADULT_OOP is Low, etc. Such a linguistic partitioning can be achieved by using fuzzy membership functions. In the exemplary embodiment of the present invention, the membership functions were generated using an Expectation Maximization algorithm (EM). For each feature, an optimal number of Gaussian memberships were estimated using the EM algorithm. These Gaussian memberships were then ranked so that they correspond to linguistic terms Low, Medium, or High. Note that the output of the second layer nodes indicates the degree to which the input features satisfy these linguistic terms. Note also that the membership functions can be generated by other techniques known in the art.

At each node in the network, the GM operator is used to aggregate evidence presented to the node. Thus, at each node both p and $w_i$ are to be learned. The overall network structure is learned from the data by minimizing the sum of squared errors given below.

$$E = \sum_{k=1}^{N} (f_k - y_k)^2$$

In the equation above, $f_k$ is the aggregation function and $x_{1k}, \ldots x_{nk}$ are the inputs in the equation shown below:

$$f_k = \left(\frac{w_1^2}{\Sigma w_i^2} x_1^p + \ldots + \frac{w_n^2}{\Sigma w_i^2} x_n^p\right)^{1/p}$$

The network structure and parameters can be learned through the use of the back propagation technique known in the art. With this technique, the update equations for the node weights $w_i$ and parameters are given by:

$$w_i^{new} = w_i^{old} - 2\eta \sum_{k=1}^{N} (f_k - y_k) \frac{\partial f_k}{\partial w_i}, i = 1, \ldots, n$$

-continued $$p^{new} = p^{old} - 2\beta \sum_{k=1}^{N} (f_k - y_k) \frac{\partial f_k}{\partial p}$$

where h and b are suitable learning rate constants. The choice of h and b determines the speed and reliability of convergence. The partial derivatives of $f_k$ with respect to $w_i$ and p are given in the equations below:

$$\frac{\partial f_k}{\partial p} = \frac{f_k^{1-p}}{p^2} \left( \sum_{i=1}^{n} \frac{w_i^2}{\sum w_i^2} x_{ik}^p \ln x_{ik}^p - f_k^p \ln f_k^p \right)$$

$$\frac{\partial f_k}{\partial w_i} = \frac{2w_i}{p \sum w_i^2} f_k^{1-p} (x_{ik}^p - f_k^p)$$

The equations for the node weights $w_i$ and parameter p are iterated until convergence, that is, until there is no change in $w_i$ and p. After convergence, it has been observed that some nodes tend to have zero weights. This implies that the features that are being input to the nodes are either redundant or superfluous and can be eliminated from the final decision making process.

VIII. Reduction To Practice

An occupant detection system according to the present invention was demonstrated by collecting data from various occupant scenarios. A sensor fusion engine according to the present invention was trained with eleven-dimensional data collected from Hausdorff, edge, and motion classifiers. The eleven dimensional data was split into training (9700 patterns) and testing (10195 patterns) sets. The same occupant or child seat did not occur in both the training and test sets. The three different sensor fusion classifiers were trained from the training set. Their classification rates on the test set were then computed. The results comparing their individual performances and combined performance using different decision-making techniques is shown below. While the different decision-making techniques were each used for edge, motion, and Hausdorff classification, the fusion of the outputs from the classifier modules was performed by a FAN.

the literature. As shown above, the features from the edge density map were more accurately classified by the C5 algorithm than by an NDA network algorithm.

The NDA network results were based on using training set noise injection based on test set error. In the NDA network used in this exemplary embodiment of the present invention, a training procedure was used wherein the prediction performance on the test set data was used as feedback to add noise to the training data. This procedure is referred to as a noise injection procedure as described in Grandvalet, Y., et al in "Noise Injection: Theoretical Prospects," Neural Computation, vol. 9, pp. 1093–1108, 1997. Noise injection helps in improving the ability of NDA to overcome local minima during the gradient descent process which is used for adjusting the weights. As long as the training proceeds to decrease the normalized system error, there is no noise injected. However, if the error increases (which is an indication of being stuck in local minima), then a small fraction of noise (typically ±10% of each feature's input value range) is injected into the training data. This injection simulates the creation of additional training data and helps the NDA recover from the local minima. As shown above, the features from the motion density map were more accurately classified by the NDA network algorithm than by C5 algorithm.

The FAN results were obtained without using trial boosting or noise injection. As shown above, the performance using the combined classifiers is consistently higher than any of the separate classifiers, which demonstrates the performance improvement provided by the sensor fusion of the present invention. The results also demonstrate that the performance of FAN is similar to that of C5 or the NDA network. Note, however, that these results are dependent upon the test sets and data sets used. Therefore, the present invention is not limited to the use of the C5 algorithm for classification from edge features and the NDA network algorithm for classification from motion features.

FAN only uses two rules for sensor fusion in contrast with C5 and NDA. Using FAN, once the network is trained, the knowledge can be interpreted by simple rules. The GM operator at each node can be approximated by either a min, max, Geometric Mean (GM), or Average (AV) operator depending on the value of p. The approximate rules from FAN for the training data sets reported above are shown below.

|  | C5 | | | NDA | | | FAN | | |
|---|---|---|---|---|---|---|---|---|---|
|  | Enable | Disable | Total | Enable | Disable | Total | Enable | Disable | Total |
| Hausdorff Template | 50 | 89.6 | 69.8 | 70.3 | 95.8 | 83.1 | 59.3 | 91.7 | 75.5 |
| Edge Density | 94 | 95.8 | 94.9 | 92.3 | 99.5 | 95.9 | 90.9 | 99.2 | 95 |
| Motion Density | 85.2 | 82.4 | 83.8 | 86.1 | 82 | 84 | 82.8 | 87.4 | 85.1 |
| Combined | 98.2 | 98.6 | 98.4 | 98.6 | 98.4 | 98.5 | 96.9 | 99.3 | 98.1 |

The C5 algorithm results were based on 10 trial boosting without cross-validation. Boosting is a well-known method for improving the performance of a classifier by combining the outputs of multiple similar classifiers operating in parallel. Basically, the first classifier is trained and then tested. A second classifier is then trained using a larger proportion of "difficult" cases which the first classifier had difficulty with, and so on. 10-trial boosting means that the results of 10 parallel classifiers were combined using a voting method. Several different boosting methods have been published in Template+Edges+Motion:
Approximate Rule 1: If Edge-RFIS is LOW AV Edge-OOP is LOW AV Motion-RFIS is LOW AV Motion OOP is LOW Then ENABLE
Approximate Rule 2: If Edge-ADULT is (MEDIUM OR LOW) AND Edge-FFIS is LOW AND Motion-FFIS is VERY LOW Then DISABLE
Hausdorff Template Only:
Approximate Rule 1: If RFIS-1 is LOW AND RFIS-2 is LOW AND FFIS is HIGH Then ENABLE Approximate Rule 2: If RFIS-1 is HIGH OR RFIS-2 is HIGH OR FFIS is LOW Then DISABLE Edge Density Only:

Approximate Rule 1: If RFIS is LOW GM OOP is LOW Then ENABLE

Approximate Rule 2: If RFIS is (MEDIUM OR HIGH) OR ADULT is LOW Then DISABLE

Figure 12:
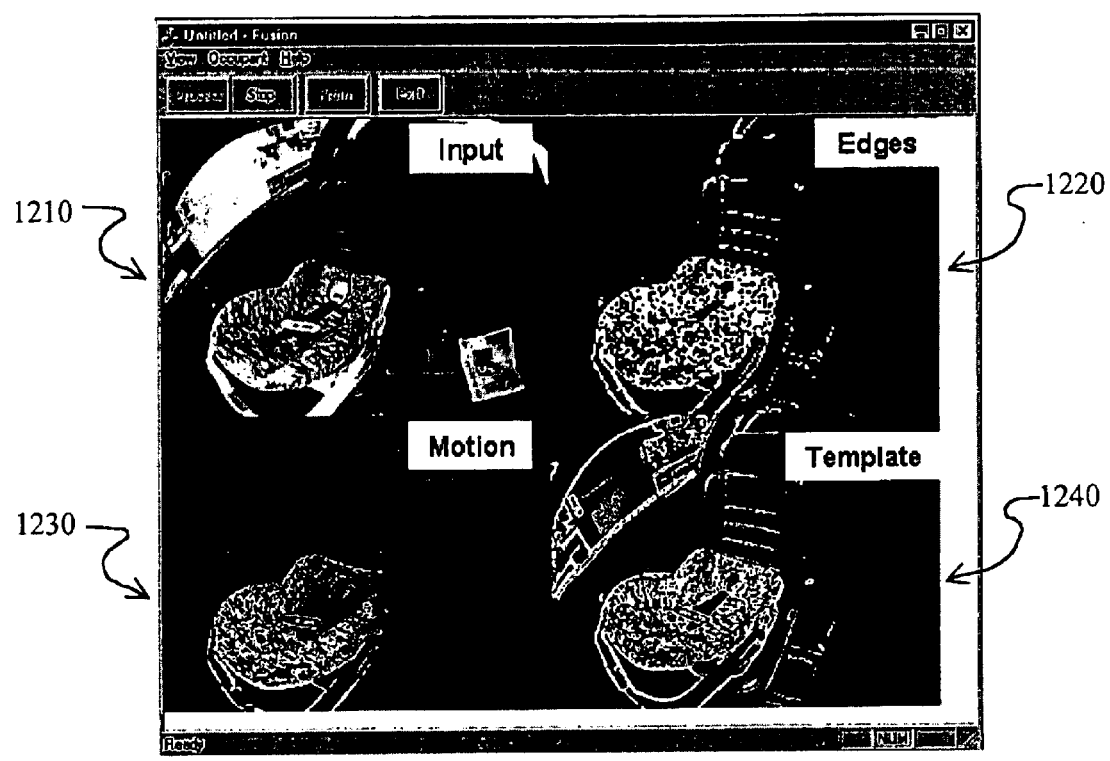
FIG. 12 shows an example of screen display generated by a software application implementing an occupant detection system according to the present invention running on a personal computer.

Motion Density Only:

Approximate Rule 1: If RFIS is LOW OR OOP is LOW OR ADULT is HIGH or FFIS is HIGH Then ENABLE Approximate Rule 2: If OOP is HIGH or FFIS is VERY LOW Then DISABLE An occupant detection system according to the present invention has been implemented as an application running on a personal computer. This application receives as an input an image of the front passenger portion of a car. The application processes the image with the three classifiers previously discussed: edge density; motion density; and Hausdorff template, to determine whether the an occupant is an RFIS (rear-facing infant seat), Adult_OOP (adult out of position), Adult_NT (adult in normal or twisted position), or FFIS (front-facing infant seat). The final airbag enable or disable decision is made by the sensor fusion engine on the basis of the outputs and confidence levels of the classifiers. FIG. 12 shows an example of a screen display generated by the application running on the personal computer. In FIG. 12, the original image 1210 is shown, along an image 1220 used by the edge density classifier, an image 1230 used by the motion density classifier, and an image 1240 used by the Hausdorff template classifier. Executing on a personal computer, the application provides 16 updates per second on the airbag enable/disable decision.

IX. Other Embodiments

Other embodiments of the present invention for use in vehicle occupant detection and tracking may be adapted to provide other classifications of vehicle occupants, such as small adult, small child, pet, etc. With the present invention, provision of additional classifications should have little impact on computation complexity and, therefore, update rates, since the classification processing is based upon rules determined by off-line training as described above. The additional classifications can then also be used to make an airbag deployment decision.

A preferred embodiment of the present invention has been discussed in terms of providing a deployment decision to an airbag deployment system, but the apparatus and method of the present invention may also be used to control other features in an airbag deployment system or used to control other systems within a vehicle. For example, alternative embodiments of the present invention may provide decisions as to the strength at which the airbags are to be deployed, or decisions as to which airbags within a vehicle are to be deployed. Also, embodiments of the present invention may provide decisions for controls over seat belt tightening, seat position, air flow from a vehicle temperature control system, etc.

Other embodiments of the present invention may also be applied to other broad application areas such as Surveillance and Event Modeling. In the surveillance area, the present invention provides detection and tracking of people/objects within sensitive/restricted areas (such as embassies, pilot cabins of airplanes, driver cabins of trucks, trains, parking lots, etc.), where one or more cameras provide images of the area under surveillance. In such an embodiment of the present invention, the change detection, motion density and edge density maps would remain the same. The Hausdorff template matching module would be adapted to recognize adult/human templates instead of RFIS and FFIS. In this embodiment, the classification modules would be trained to detect humans within the viewing area of one or more cameras using the information gathered from the motion density map, edge density map and Hausdorff template module. The classification decisions from these modules can then be fused using the FAN to provide us the final decision as to the detection of a human within the surveillance area.

In the case of event modeling, other embodiments of the present invention would track the detected human across multiple images and identify the type of action being performed. It may be important for a given application that the human not walk in a certain direction or run, etc. within a restricted area. In order to perform event modeling, an additional motion signature module would first extract motion signatures from the detected humans. These motion signatures would be learned using a classification algorithm such as NDA or C5 and would eventually be used to detect events of interest.

From the foregoing description, it will be apparent that the present invention has a number of advantages, some of which have been described above, and others of which are inherent in the embodiments of the invention described above. For example, other classification techniques may be used to classify the status of an object. Also, it will be understood that modifications can be made to the object detection system described above without departing from the teachings of subject matter described herein. As such, the invention is not to be limited to the described embodiments except as required by the appended claims.

What is claimed is:

1. A method of object detection comprising the steps of:

capturing images of an area occupied by at least one object;

extracting image features from said images;

classifying said image features to produce object class confidence data; and performing data fusion on said object class confidence data to produce a detected object estimate.

2. The method of claim 1, wherein the step of classifying image features comprises processing said image features with one or more classification algorithms.

3. The method of claim 2, wherein at least one of said one or more classification algorithms comprises a decision tree.

4. The method of claim 3, wherein said decision tree comprises a trained C5 decision tree.

5. The method of claim 2, wherein at least one of said one or more classification algorithms comprises a trained Nonlinear Discriminant Analysis network.

6. The method of claim 2, wherein at least one of said one or more classification algorithms comprises a trained Fuzzy Aggregation Network.

7. The method of claim 2, wherein at least one of said one or more classification algorithms comprises a Hausdorff template matching process.

8. The method of claim 2, wherein said step of extracting image features comprises the steps of:

detecting edges of said at least one object within said images;

masking said edges with a background mask to find important edges;

calculating edge pixels from said important edges; and producing edge density maps from said important edges, said edge density map providing said image features, and wherein said step of classifying said image features comprises processing said edge density map with at least one of said one or more classification algorithms to produce object class confidence data.

9. The method of claim 2, wherein said step of extracting image features comprises the steps of:
   detecting motion of said at least one object within said images;
   calculating motion pixels from said motion; and
   producing motion density maps from said notion pixels, said motion density map providing said image features,
and wherein said step of classifying said image features comprises processing said motion density map with at least one of said one or more classification algorithms to produce object class confidence data.

10. The method of claim 2, wherein said step of extracting image features comprises the steps of:
   detecting edges of said at least one object within said images;
   masking said edges with a background mask to find important edges;
   calculating edge pixels from said important edges;
   detecting a change of at least one object;
   creating an object change trigger,
and wherein said step of classifying said image features comprises:
   monitoring said object change trigger; and
   performing Hausdorff template matching upon a change in said object change trigger.

11. The method of claim 2, wherein said step of extracting image features comprises the steps of:
   calculating a range to an area in said images;
   detecting motion of said at least one object within said images;
   calculating motion pixels from said motion; and
   producing motion density maps from said motion pixels, said motion density map and said range providing said image features,
and wherein said step of classifying said image features comprises processing said motion density map and range with at least one of said one or more classification algorithms to produce object class confidence data.

12. The method of claim 2, wherein the step of extracting image features comprises the steps of:
   detecting edges of said at least one object within said images;
   masking said edges with a background mask to find important edges;
   calculating edge pixels from said important edges;
   producing edge density maps from said edge pixels;
   detecting motion of said at least one object within said images;
   calculating motion pixels from said motion;
   producing motion density maps from said motion pixels;
   detecting a change of at least one object; and
   creating an object change trigger, wherein said object change trigger, said edge pixels, said edge density map, and said motion density map comprise said image features,
wherein said step of classifying said image features comprises:
   processing said edge density map with one of said one or more classification algorithms to produce a first subset of object class confidence data;
   processing said motion density map with one of said one or more classification algorithms to produce a second subset of object class confidence data;
   monitoring said object change trigger, and
   performing Hausdorff template matching upon a change in said object change trigger to produce a third subset of object class confidence data.
and wherein said step of performing data fusion on said object class confidence data comprises:
   processing said first subset, said second subset, and said third subset with a Fuzzy Aggregation Network to produce a detected object estimate.

13. The method of claim 12, wherein the step of extracting image features further comprises the step of calculating a range to an area in said images, and wherein said step of classifying said image features further comprises tracking said range to produce equivalent rectangle features, and wherein said step of performing data fusion on said object class confidence data further comprises processing said equivalent rectangle features, said fist subset, said second subset, and said third subset with a Fuzzy Aggregation Network to produce a detected object estimate.

14. The method of claim 2, wherein at least one classification algorithm of said one or more classification algorithms is trained by providing training patterns to said at least one classification algorithm.

15. The method of claim 1 wherein said object comprises a vehicle occupant and said area comprises a vehicle occupancy area and further comprising the step of processing said detected object estimate to provide signals to vehicle systems.

16. The method of claim 15, wherein said signals comprise an airbag enable and disable signal.

17. The method of claim 1, wherein said images are captured by one or more image sensors operating in a visible region of the optical spectrum.

18. The method of claim 1, wherein said images are captured by one or more image sensors producing a two-dimensional pixel representation of said captured images.

19. The method of claim 1, wherein said images are captured by one or more image sensors having a logarithmic response.

20. A system for classifying objects, said system comprising
   means for capturing images of an area occupied by at least one object;
   means for extracting features from said images to provide feature data;
   means for classifying object status based on said feature data to produce object class confidences; and
   means for processing said object class confidences to produce system output controls.

21. The system according to claim 20, wherein said means for classifying object status comprises one or more classification algorithms processing said feature data to produce said object class confidences.

22. The system according to claim 21, wherein at least one of said one or more classification algorithms comprises a decision tree.

23. The system according to claim 22, wherein said decision tree comprises a trained C5 decision tree.

24. The system according to claim 21, wherein at least one of said one or more classification algorithms comprises a trained Nonlinear Discriminant Analysis network.

25. The system according to claim 21, wherein at least one of said one or more classification algorithms comprises a trained Fuzzy Aggregation Network.

26. The system according to claim 21, wherein at least one of said one or more classification algorithms comprises a Hausdorff template matching process.

27. The system according to claims 21, wherein said means for extracting features comprises an edge detector module providing an edge density map as said feature data, and said means for classifying object status comprises an edge classifier module using at least one of said one or more classification algorithms producing said object class confidences.

28. The system according to claim 21, wherein said means for extracting features comprises a motion detector module providing a motion density map as said feature data, and said means for classifying object status comprises a motion classifier module using at least one of said one or more classification algorithms producing said object class confidences.

29. The system according to claim 21, wherein said means for extracting features comprises an edge detector module providing edge pixels and an object change detection module providing an object change trigger, said edge pixels and said object change trigger comprising said feature data, and said means for classifying object status comprises a Hausdorff template matching module producing said object class confidences.

30. The system according to claim 21, wherein said means for capturing images comprises a means for capturing stereo images of said area, said means for extracting features comprises a motion detector module providing a motion density map and a range map module providing a range value, said motion density map and said range value comprising said feature data, and said means for classifying object status comprises a motion classifier module using at least one of said one or more classification algorithms producing said object class confidences.

31. The system according to claim 21, wherein said means for extracting features comprises:
   an edge detector module providing an edge density map and edge pixels;
   a motion detector module providing a motion density map; and
   an object change detection module providing an object change trigger,
wherein said edge density map, said edge pixels, said motion density map and said object change trigger comprise said feature data,
   and said means for classifying object status comprises
      an edge classifier module using one of said one or more classification algorithms to produce a first subset of class confidences from said edge density map;
      a motion classifier module using one of said one or more classification algorithms to produce a second subset of class confidences from said motion density map; and
      a Hausdorff template matching module producing a third subset of class confidences from said edge pixels and said object change trigger,
wherein said first subset, said second subset, and said third subset comprise said object class confidences.

32. The system according to claim 31, wherein said means for capturing images comprises a means for capturing stereo images of said area, and said means for extracting features further comprises a range map module providing a range value and said feature data further comprises said range value, and said means for classifying object status further comprises an object-out-of-position tracking module using a tracking algorithm to produce equivalent rectangle features from said motion pixels and said range, and said object class confidences further comprises said equivalent rectangle features.

33. The system according to claim 31, wherein said first subset of class confidences comprises values for rear-facing infant seat, front-facing infant seat, adult out-of-position, and adult in normal or twisted position; said second subset of class confidences comprises values for rear-facing infant seat, front-facing infant seat, adult out-of-position, and adult in normal or twisted position; and said third subset of class confidences comprise values for a first rear-facing infant seat, a second rear-facing infant seat, and a front-facing infant seat.

34. The system of claim 21, wherein at least one classification algorithm of said one or more classification algorithms is trained by providing training patterns to said at least one classification algorithm.

35. The system according to claim 20, wherein said means for processing said object class confidences comprises a trained Fuzzy Aggregation Network.

36. The system according to claim 20, wherein said means for capturing images comprises at least one CMOS vision sensor.

37. The system according to claim 20, wherein said means for capturing images comprises at least one CCD vision sensor.

38. The system according to claim 20, wherein said system comprises an airbag deployment control system and wherein said system output controls comprise control signals that enable or disable at least one vehicle airbag.

39. The system of claim 20, wherein said means for capturing images comprises one or more image sensors operating in a visible region of the optical spectrum.

40. The system of claim 20, wherein said means for capturing images comprises one or more image sensors producing a two-dimensional pixel representation of said captured images.

41. The system of claim 20, wherein said means for capturing images comprises one or more image sensors having a logarithmic response.

42. An object detection system providing control signals, said object detection system comprising:
   at least one imaging sensor for capturing images of an area and providing digital representations of said images;
   at least one image feature extractor module receiving said digital representations and providing image features;
   at least one image feature classifier module receiving said image features and providing object class confidences; and
   a sensor fusion engine receiving said object class confidences and providing control signals.

43. The object detection system according to claim 42, wherein said at least one image feature classifier module comprises one or more classification algorithms.

44. The object detection system according to claim 34, wherein a at least one of said one or more classification algorithms comprises a decision tree.

45. The object detection system according to claim 44, wherein said decision tree comprises a trained C5 decision tree.

46. The object detection system according to claim 43, wherein a least one of said one or more classification algorithms comprises a trained Nonlinear Discriminant Analysis network.

47. The object detection system according to claim 43, wherein a least one of said one or more classification algorithms comprises a trained Fuzzy Aggregation Network.

48. The object detection system according to claim 43, wherein a least one of said one or more classification algorithms comprises a Hausdorff template matching process.

49. The object detection system according to claim 43, wherein said at least one feature extractor module comprises an edge detector module producing edge density maps as said image features, and said at least one image feature classifier module comprises an edge classifier module comprising at least one of said one or more classification algorithms to produce said object class confidences.

50. The object detection system according to claim 43, wherein said at least one feature extractor module comprises a motion detector module producing motion density maps as said image features, and said at least one image feature classifier module comprises a motion classifier module comprising at least one of said one or more classification algorithms to produce said object class confidences.

51. The object detection system according to claim 43, wherein said at least one feature extractor module comprises an edge detector module producing edge pixels and an object change detection module producing an object change trigger, said edge pixels and said object change trigger comprising said image features, and said at least one image feature classifier module comprises a Hausdorff template matching module producing said object class confidences.

52. The object detection system according to claim 43, wherein said at least one imaging sensor comprises a pair of image sensors located a fixed distance a part and viewing a substantially similar portion of said area, said at least one feature extractor module comprises a motion detector module producing motion density maps and a range map module performing image producing range values, said motion density maps and said range values comprising said image features, and said at least one image feature classifier module comprises a motion classifier module comprising at least one of said one or more classification algorithms to produce said object class confidences.

53. The object detection system according to claim 43, wherein said at least one feature extractor module comprises:
   an edge detector module producing edge density maps and edge pixels;
   a motion detector module producing motion density maps; and
   an object change detection module producing an object change trigger,
wherein said edge density maps, said edge pixels, said motion density maps and said object change trigger comprise said image features,
   and said at least one image feature classifier module comprises:
      an edge classifier module comprising at least one of said one or more classification algorithms producing a first subset of class confidences from said edge density maps,
      a motion classifier module comprising at least one of said one or more classification algorithms producing a second subset of class confidences from said motion density maps; and
      a Hausdorff template matching module producing a third subset of class confidences from said edge pixels and said object change trigger,
wherein said first subset, said second subset, and said third subset comprise said object class confidences.

54. The object detection system according to claims 53, wherein said at least one imaging sensor comprises a pair of image sensors located a fixed distance a part and viewing a substantially similar portion of said area, and said at least one feature extractor module further comprises a range map module producing range values and said image features further comprise said range values, and said at least one image feature classifier module further comprises an object-out-of-position tracing module comprising a tracking algorithm to produce equivalent rectangle features from said motion pixels and said range, and said object class confidences further comprise said equivalent rectangle features.

55. The object detection system according to claim 53, wherein said first subset of class confidences comprises values for rear-facing infant seat, front-facing infant seat, adult out-of-position, and adult in normal or twisted position; said second subset of class confidences comprises values for rear-facing infant seat, front-facing infant seat, adult out-of-position, and adult in normal or twisted position; and said third subset of class confidences comprise values for a first rear-facing infant seat, a second rear-facing infant seat, and a front-facing infant seat.

56. The system of claim 43, wherein at least one classification algorithm of said one or more classification algorithms is trained by providing training patterns to said at least one classification algorithm.

57. The object detection system according to claim 42, wherein said sensor fusion engine comprises a Fuzzy Aggregation Network algorithm.

58. The object detection system according to claim 42, wherein said at least one imaging sensor comprises at least one CMOS vision sensor.

59. The object detection system according to claim 42, wherein said at least one imaging sensor comprises at least one CCD vision sensor.

60. The object detection system according to claim 42, wherein said area comprises an occupancy area of a vehicle and wherein said control signals comprise an airbag enable or disable signal.

61. The system of claim 42, wherein said at least one imaging sensor operates in a visible region of the optical spectrum.

62. The system of claim 42, wherein said at least one imaging sensor produces a two-dimensional pixel representation of said captured images.

63. The system of claim 42, wherein said at least one imaging sensor has a logarithmic response.

64. The object detection system according to claim 42, wherein said system comprises a software system having computer-executable instructions executing on a suitable computer system.

* * * * *